United States Patent
Cao et al.

(10) Patent No.: US 8,970,586 B2
(45) Date of Patent: Mar. 3, 2015

(54) BUILDING CONTROLLABLE CLAIRVOYANCE DEVICE IN VIRTUAL WORLD

(75) Inventors: Bao Hua Cao, Los Angeles, CA (US); Qi Cheng Li, Beijing (CN); Jian Wang, Beijing (CN); Yi Min Wang, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 13/283,795

(22) Filed: Oct. 28, 2011

(65) Prior Publication Data

US 2012/0105446 A1    May 3, 2012

(30) Foreign Application Priority Data

Oct. 29, 2010 (CN) .......................... 2010 1 0532242

(51) Int. Cl.
*G06T 15/40* (2011.01)
*G06T 15/30* (2011.01)
*G06T 15/50* (2011.01)

(52) U.S. Cl.
CPC ................ *G06T 15/30* (2013.01); *G06T 15/40* (2013.01); *G06T 15/503* (2013.01)
USPC ...................................................... 345/421

(58) Field of Classification Search
None
See application file for complete search history.

(56) References Cited

U.S. PATENT DOCUMENTS 6,222,465 B1    4/2001   Kumar
6,912,293 B1 *  6/2005   Korobkin ..................... 382/100
6,950,106 B2 *  9/2005   Torii et al. .................... 345/506
7,103,499 B2    9/2006   Goodwin
7,466,303 B2   12/2008   Yi
7,576,725 B2    8/2009   Bathiche
7,649,976 B2    1/2010   Georgeson
7,787,674 B2    8/2010   Eichhorn (Continued)

FOREIGN PATENT DOCUMENTS

CN    101006933 A    8/2007
CN    101529924 A    9/2009
CN    101686335 A    3/2010

OTHER PUBLICATIONS

Sunao Hashimoto, et al. "A method of creating a transparent space based on mixed reality." Artificial Life and Robotics, vol. 11, No. 1, 57-60, 2006 (abstract only).

(Continued)

*Primary Examiner* — Ryan R Yang
(74) *Attorney, Agent, or Firm* — Jeff Tang; Otterstedt, Ellenbogen & Kammer, LLP (57) ABSTRACT

A clairvoyance method for 3D scene is disclosed, including the steps of acquiring parameters associated with a clairvoyance camera and parameters associated with a clairvoyance viewport; determining a 3D scene to be rendered according to the parameters associated with the clairvoyance camera; rendering the determined 3D scene to obtain a 2D image presented in the clairvoyance viewport; and composing the 2D image presented in the clairvoyance viewport and a 2D image presented in a general scene viewport. With the method of the present invention, the covered 3D scene can be made clairvoyant to be viewed in a user-controllable way, and further an object can be selected in the clairvoyant 3D scene for manipulation, without manipulating the covering object. Thus, one or more embodiments of the present invention have advantages of simple and easy operation and high efficiency.

18 Claims, 7 Drawing Sheets

(56) References Cited

U.S. PATENT DOCUMENTS

| | | | |
|---|---|---|---|
| 8,619,081 B2* | 12/2013 | Ikeda et al. | 345/427 |
| 2007/0195083 A1* | 8/2007 | Yoo et al. | 345/420 |
| 2007/0229502 A1* | 10/2007 | Tong et al. | 345/426 |
| 2007/0238959 A1 | 10/2007 | John et al. | |
| 2009/0109218 A1* | 4/2009 | Koseki et al. | 345/422 |
| 2010/0110068 A1 | 5/2010 | Yamauchi et al. | |
| 2010/0169310 A1 | 7/2010 | Latzina | |
| 2010/0303337 A1* | 12/2010 | Wallack et al. | 382/154 |
| 2012/0019533 A1* | 1/2012 | Tabellion | 345/423 |

OTHER PUBLICATIONS

Doug A. Bowman, et al. An Evaluation of Techniques for Grabbing and Manipulating . . . Environments. Proceedings of the 1997 symposium on Interactive 3D graphics SI3D 97 (1997).

* cited by examiner

BUILDING CONTROLLABLE CLAIRVOYANCE DEVICE IN VIRTUAL WORLD

CROSS-REFERENCE TO RELATED APPLICATION(S)

This application claims foreign priority to P.R. China Patent application 201010532242.7 filed 29 Oct. 2010, the complete disclosure of which is expressly incorporated herein by reference in its entirety for all purposes.

FIELD OF THE INVENTION

The present invention relates to computer 3D (three-dimension) technology, and specifically, to the technology of making covered objects in 3D scenes clairvoyant, thereby editing or manipulating the covered objects.

BACKGROUND OF THE INVENTION

Currently, 3D scene design and production has been widely used in the fields of computer animation, virtual world, game scene, landscape design, architecture design, etc. For designers of the 3D scene, they need to model and edit 3D objects, while for users of the 3D scene, they sometimes need to create or edit the 3D objects in the 3D scenes.

However, in the 3D scene, some object(s) will be covered by other object(s) due to the different spatial positions of the objects. Especially for the complex 3D scenes or objects with complex assembly relationships, the objects located deeper in the 3D scenes or the objects inside the models are often covered by other objects. In this case, when the covered object needs to be modified (e.g., change the object, move its position, change its direction, change its size, etc), it is necessary to avoid the covering object to manipulate the covered object.

Typically, two methods can be used to avoid the covering object to manipulate the covered object. One method is to change the position of a scene camera. The scene camera usually represents the user's angle of view, i.e. screen. So the covered object can be viewed and modified by arranging the scene camera behind the covering object. The other method is to directly move the covering object away to make the covered object exposed for manipulation, and to recover the covering object after the manipulation is implemented. However, both methods have the problems of inconvenient manipulation and low efficiency.

SUMMARY OF THE INVENTION

The present invention is proposed in view of the above technical problems, and its object is to provide a clairvoyance method and device for 3D scene, which can make the covered 3D scene clairvoyant in a user-controllable way, and further select an object in the clairvoyant 3D scene for manipulation, without manipulating a covering object, and thus have advantages of simple and easy operation and high efficiency.

According to one aspect of the present invention, there is provided a clairvoyance method for 3D scene, which comprises: acquiring parameters associated with a clairvoyance camera and parameters associated with a clairvoyance viewport; determining a 3D scene to be rendered according to the parameters associated with the clairvoyance camera; rendering the determined 3D scene to obtain a 2D image presented in the clairvoyance viewport; and composing the 2D image presented in the clairvoyance viewport and a 2D image presented in a general scene viewport.

According to another aspect of the present invention, a clairvoyance device for 3D scene is provided, which comprises: a parameter acquiring module that acquires parameters associated with a clairvoyance camera and parameters associated with a clairvoyance viewport; a scene determining module that determines a 3D scene to be rendered according to the parameters associated with the clairvoyance camera; a render module that renders the determined 3D scene to obtain a 2D image presented in the clairvoyance viewport; and a composing module that composes the 2D image presented in the clairvoyance viewport and a 2D image presented in a general scene viewport.

DETAILED DESCRIPTION OF PREFERRED EMBODIMENTS

The above and other objects, features and advantages of the present invention will become more apparent from the following detailed description of the preferred embodiments of the present invention in conjunction with the drawings.

Figure 1:
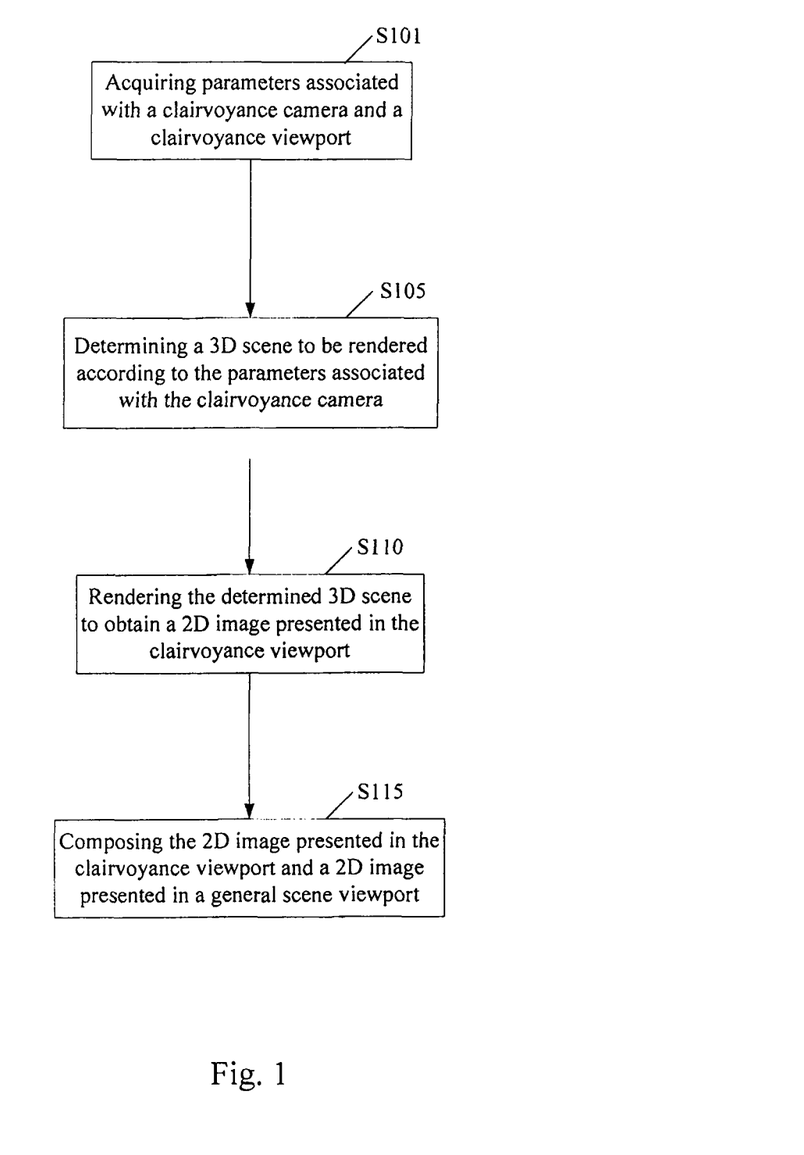
FIG. 1 is a flow chart of a clairvoyance method for 3D scene according to an embodiment of the present invention.

FIG. 1 is a flow chart of a clairvoyance method for 3D scene according to an embodiment of the present invention. This embodiment will be described below in detail in conjunction with the drawings.

As shown in FIG. 1, in step S101, parameters associated with a clairvoyance camera and parameters associated with a clairvoyance viewport are acquired.

In the rendering process of the 3D scene, the camera is used to determine which 3D objects in the 3D scene can be transformed to the 2D images, and the viewport is used to clip and present the 2D images. In order to make the covered objects in the 3D scene clairvoyant, in this embodiment, besides the original general scene camera and general scene viewport for the whole 3D scene, the clairvoyance camera and clairvoyance viewport for the clairvoyance scene are introduced. By arranging the clairvoyance camera and clairvoyance viewport, the desired clairvoyant objects can be selected and presented.

Figure 2:
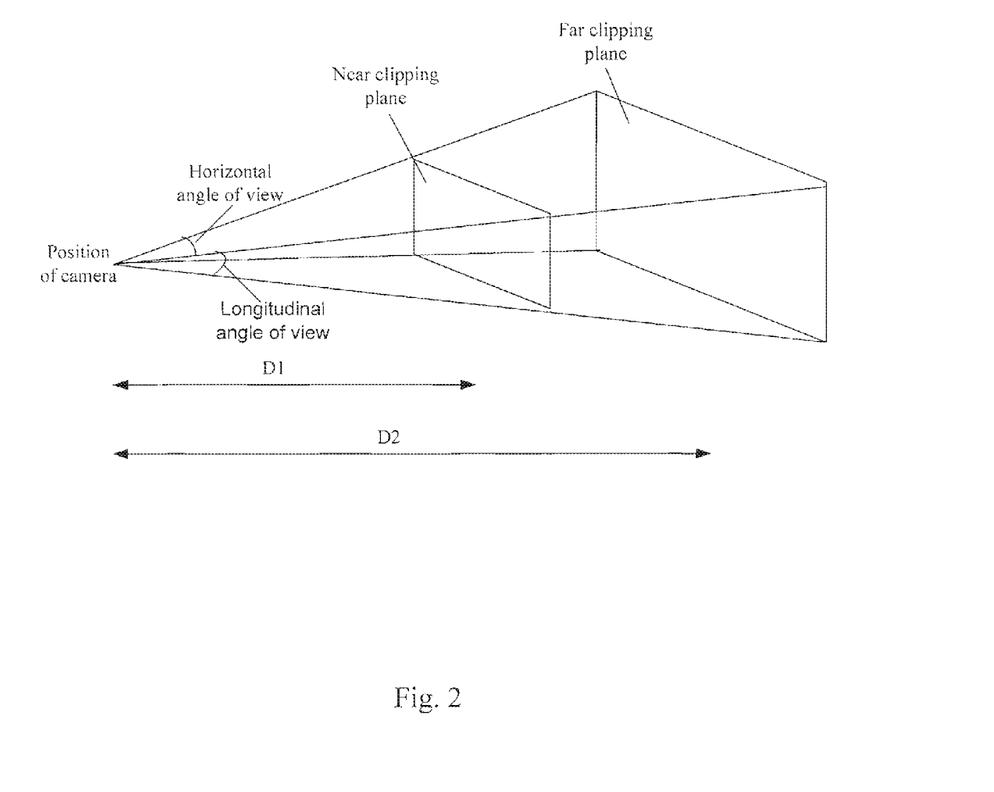
FIG. 2 is a schematic diagram showing a camera model in the 3D scene.

In the embodiment, the parameters associated with the clairvoyance camera can include: the position and direction of the clairvoyance camera; and the angle of view, near clipping plane and far clipping plane of a view frustum. As shown in FIG. 2, the position (i.e. viewpoint) of the clairvoyance camera is used to indicate the position of the clairvoyance camera in the 3D space, and is usually represented by coordinates. The direction of the clairvoyance camera contains the orientation and "upward" direction of the clairvoyance camera. The view frustum is the frustum including angle of view, near clipping plane and far clipping plane, and only the objects located within the view frustum can be displayed. The angle of view of the view frustum includes longitudinal and horizontal angles of view, which determines the view field of the clairvoyance camera. The near clipping plane and far clipping plane are represented by the distances D1, D2 from the position of the clairvoyance camera to the respective clipping planes. By adjusting the angle of view, the near and far clipping planes of the view frustum, the 3D scene in the view frustum can be selected to enable the clairvoyance camera to "see" different 2D images. Although only the parameters associated with the clairvoyance camera are described with reference to FIG. 2, those skilled in the art can understand that the general scene camera also has the same parameters.

Moreover, the parameters associated with the clairvoyance viewport include the position, shape and size of the clairvoyance viewport. In the embodiment, the position of the clairvoyance viewport is associated with the covered object to be made clairvoyant, and is usually represented by the coordinates of the upper left corner point. The shape of the clairvoyance viewport can be any kind of shape, such as rectangle, circle, polygon, etc. The size of the clairvoyance viewport uses respective parameters according to the shape. For example, for the clairvoyance viewport with rectangular shape, the size is specified with the length and width of the rectangle. For the general scene viewport, its shape is usually the rectangular shape, with the same size as the screen size.

The above parameters associated with the clairvoyance camera and the clairvoyance viewport can be determined by a user. Alternatively, only a part of the parameters can be set by the user, for example, the near and far clipping planes, position, shape and size of the clairvoyance viewport, etc.

Then in step S105, the 3D scene to be rendered is determined according to the acquired parameters associated with the clairvoyance camera.

As mentioned above, only the objects within the view frustum can be displayed, and the user can adjust the size of the view frustum by adjusting the related parameters of the view frustum, such as the near or far clipping plane, to determine the different 3D scenes to be displayed. Thus, the 3D scene within the view frustum would be retained and the 3D scene outside the view frustum would be removed by means of the view frustum including the angle of view, the near clipping plane and the far clipping plane, which process is called clipping.

Next in step S110, rendering is performed on the determined 3D scene to obtain the corresponding 2D image presented in the clairvoyance viewport.

In the embodiment, first, the determined 3D scene is transformed to the 2D image, which is called projection. Clairvoyance transformation is used in the projection process. Because the clairvoyance transformation can make the scene far away from the camera become smaller when displayed, the 3D scene can be more truly reflected in the 2D image. Additionally, in the 3D scene, the objects far away from the camera are projected first and then other objects are projected sequentially from the far to the near.

Then, according to the parameters associated with the clairvoyance viewport, the projected 2D image is clipped and presented in the clairvoyance viewport. In the embodiment, since the position, shape and size of the clairvoyance viewport have been determined, the projected 2D image is clipped as the 2D image matching the clairvoyance viewport and is presented on the clairvoyance viewport.

In step S115, the 2D image presented in the clairvoyance viewport and the 2D image presented in the general scene viewport are composed. In the embodiment, according to the respective positions of the clairvoyance viewport and the general scene viewport, the clairvoyance viewport is superimposed on the general scene viewport to obtain the composed 2D image. Of course, those skilled in the art can understand that other composing methods can be used for this step. Finally, the composed 2D image is provided to a frame buffer for display later.

It can be seen from the above description that the clairvoyance method of this embodiment renders the corresponding 3D scene according to the parameters associated with the clairvoyance camera and the clairvoyance viewport from the user, and further composes the obtained 2D image and the 2D image in the general scene viewport, thus the covered 3D scene can be made clairvoyant in a user-controllable way, without manipulating the covering object.

Figure 3:
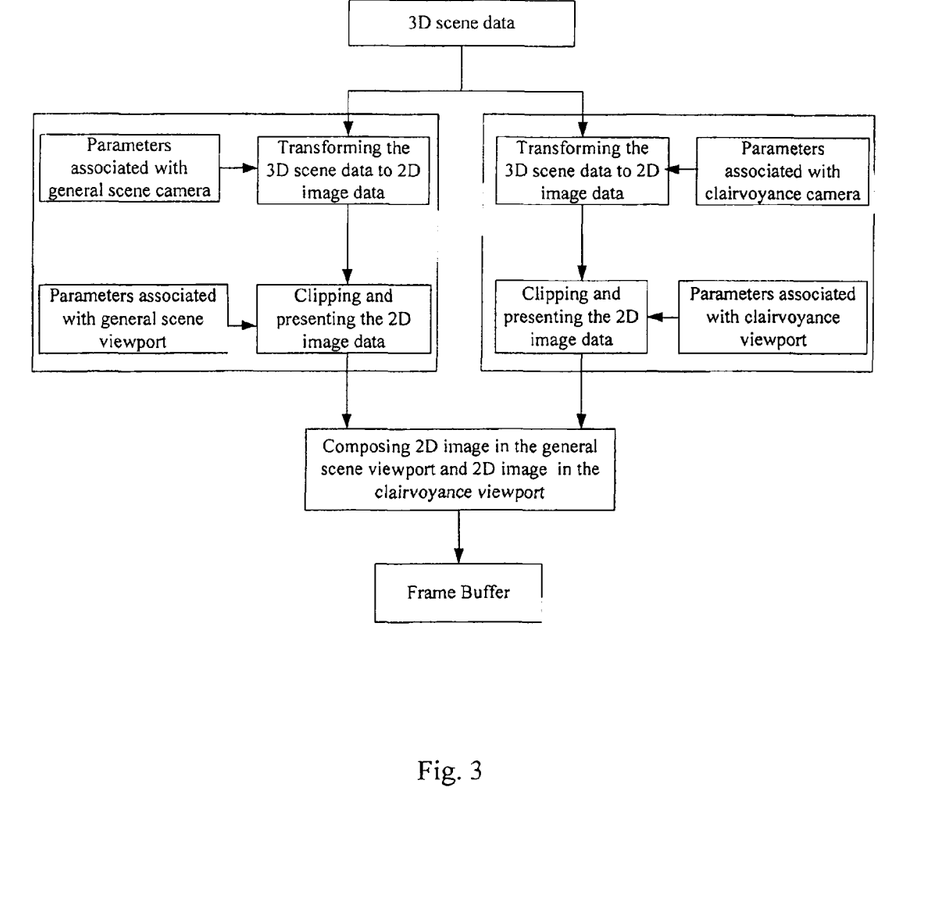
FIG. 3 is a schematic diagram illustrating an example of a 3D rendering process employing the clairvoyance method of the embodiment shown in FIG. 1.

FIG. 3 is a schematic diagram showing an example of a 3D rendering process employing the clairvoyance method of the embodiment shown in FIG. 1. In the 3D rendering process shown in FIG. 3, two parallel rendering processes are included: the rendering process for the general scene (see the left in FIG. 3) and the rendering process for the clairvoyance scene (see the right in FIG. 3), wherein the rendering process for the clairvoyance scene uses the clairvoyance method of the embodiment shown in FIG. 1. In this example, 3D scene data describing the 3D scene is stored in a database or file system. In the rendering process for the general scene, first according to the related data of the general scene camera, the corresponding 3D scene data is transformed to the 2D image data, and then according to the related data of the general scene viewport, the 2D image data is presented in the general scene viewport. In parallel, in the rendering process for the clairvoyance scene, the corresponding 3D scene data is transformed to 2D image data according to the related data of the clairvoyance camera from the user, and then the 2D image data is presented in the clairvoyance viewport according to the related data of the clairvoyance viewport. Then, the 2D image in the general scene viewport and the 2D image in the clairvoyance viewport are composed and provided to the frame buffer for output.

Figure 4:
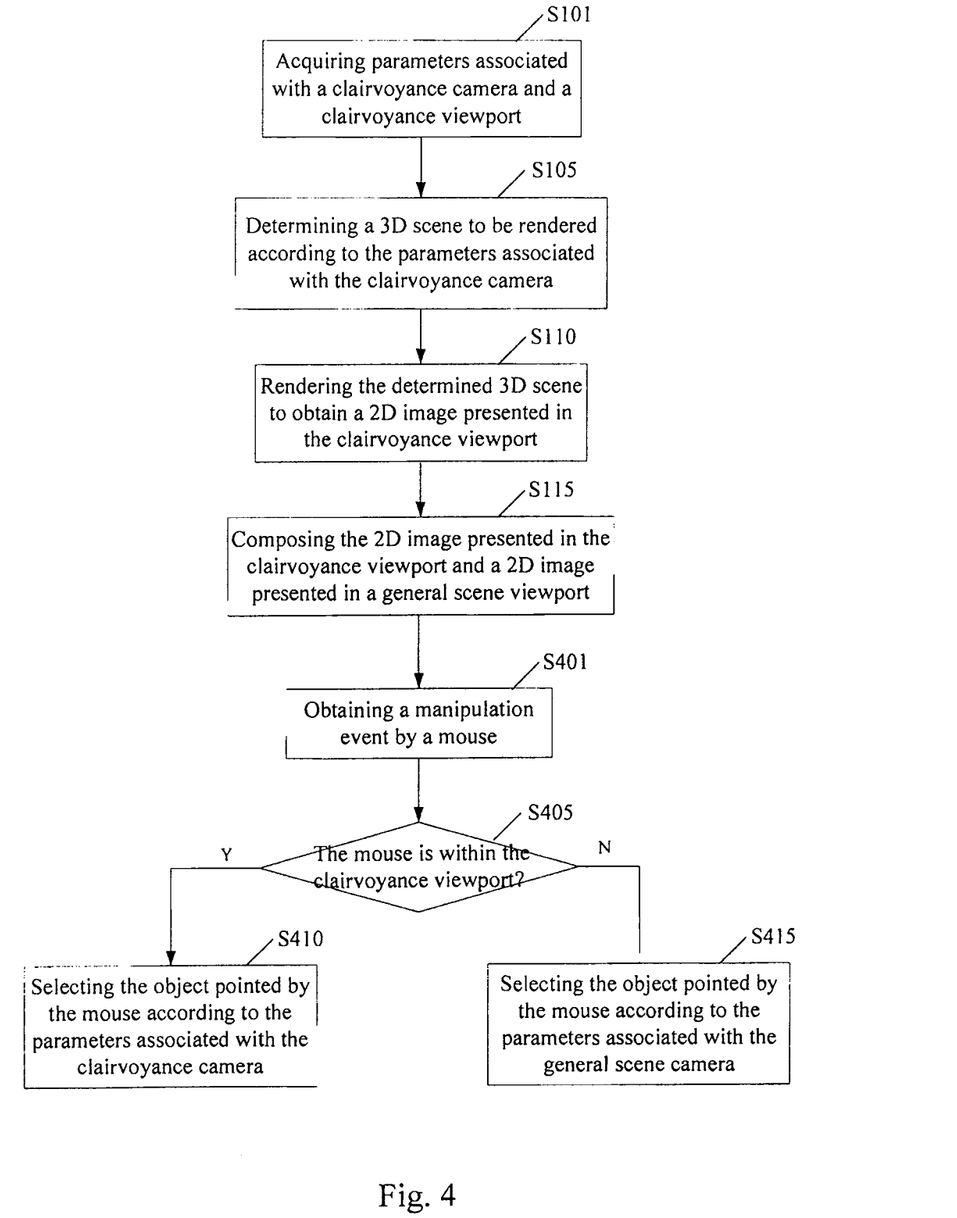
FIG. 4 is a flow chart of a clairvoyance method for 3D scene according to another embodiment of the present invention.

FIG. 4 shows a flow chart of a clairvoyance method for 3D scene according to another embodiment of the present invention. This embodiment will be described below in detail in conjunction with the drawings, wherein the same reference numbers are used for the same parts as those in the previous embodiment, and the description thereof is omitted.

In addition to the steps of the embodiment shown in FIG. 1, the clairvoyance method of this embodiment further includes the following operations.

After the composed 2D image is displayed on the screen, in step S401, a manipulation event by a mouse on the screen, such as click, mouseMove, mouseOver, etc., is obtained.

Then in step S405, it is determined whether the mouse is within the clairvoyance viewport. Generally, this can be determined from the coordinates of the mouse on the screen. If the coordinates of the mouse are within the clairvoyance viewport, it indicates that the mouse is within the clairvoyance viewport; if the coordinates of the mouse are outside the clairvoyance viewport, it indicates that the mouse is within the general scene viewport.

When the mouse is within the clairvoyance viewport, in step S410, according to the parameters associated with the clairvoyance camera, an object pointed by the mouse is selected. In this example, the screen coordinates of the mouse are first transformed to the coordinates of a point on the far clipping plane, wherein the x coordinate of the point is the abscissa of the mouse's screen coordinates, the y coordinate of the point is the ordinate of the mouse's screen coordinates, and the z coordinate of the point is the distance between the z coordinate of the clairvoyance camera and the far clipping plane. Then, the first object within the view frustum, which intersects the connection line from the position of the clairvoyance camera to one point on the far clipping plane, is determined as the selected object. When the mouse is outside the clairvoyance viewport, in step S415, according to the related parameters of the general scene camera, the same method as the method of selecting the object pointed by the mouse within the clairvoyance viewport is used to select the object pointed by the mouse. Those skilled in the art can understand that other methods for selecting the object pointed by the mouse can be used. For the selected object, the user can further edit it.

It can be seen from the above description that, in addition to making the covered 3D scene clairvoyant in a user-controllable way, the clairvoyance method of this embodiment can further select the object pointed by the mouse in the clairvoyant 3D scene to facilitate the user to edit.

Figure 5A:
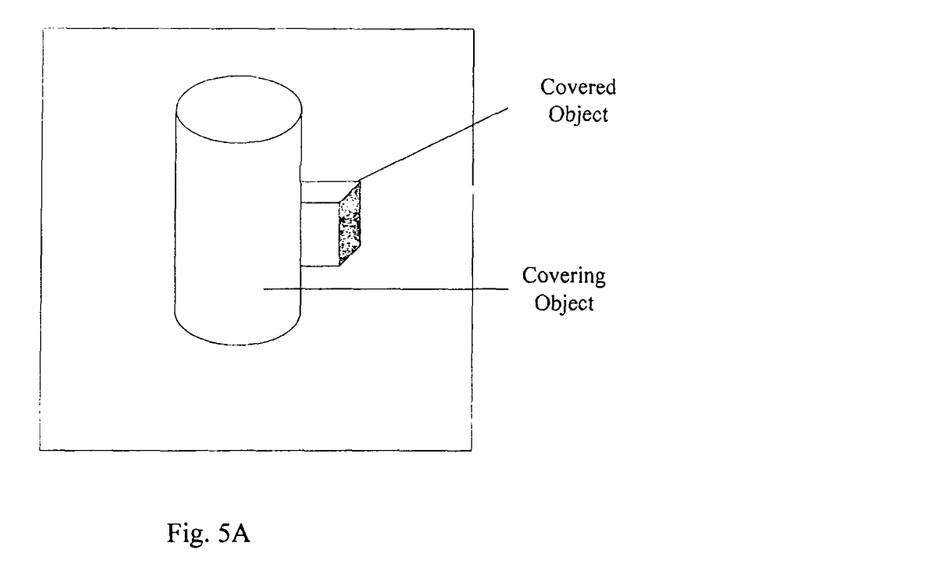
FIGS. 5A and 5B present a schematic diagram showing the use of the clairvoyance method according to the embodiments of the present invention.
Figure 5B:
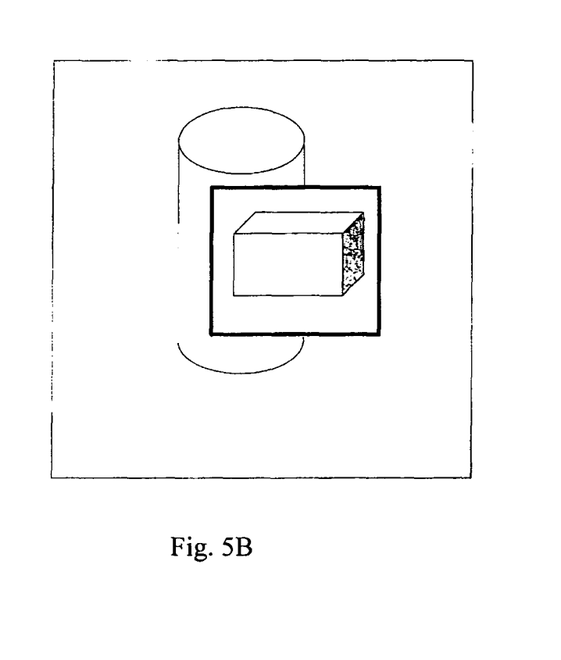

The application of the clairvoyance method of the above embodiments is described below through an example. FIG. 5A shows a schematic diagram of the scene before using the clairvoyance method, while FIG. 5B shows a schematic diagram of the scene after using the clairvoyance method. For simplicity, FIGS. 5A and 5B only show one covering object and one covered object, but those skilled in the art can understand that the scene can include many objects.

As shown in FIG. 5A, a block represents the screen, namely, the general scene viewport, and a cylinder covers a part of an object behind it. In this case, the user can not determine the shape and size of the object covered by the cylinder, and it is difficult to edit and manipulate the object. After use of the clairvoyance method of the embodiments of the present invention, the covered object can be seen, as shown in FIG. 5B. In FIG. 5B, the big block still represents the general scene viewport, and the small block represents the clairvoyance viewport. In the clairvoyance viewport, the object covered by the cylinder is displayed, thus the user can edit and manipulate the object.

Figure 6:
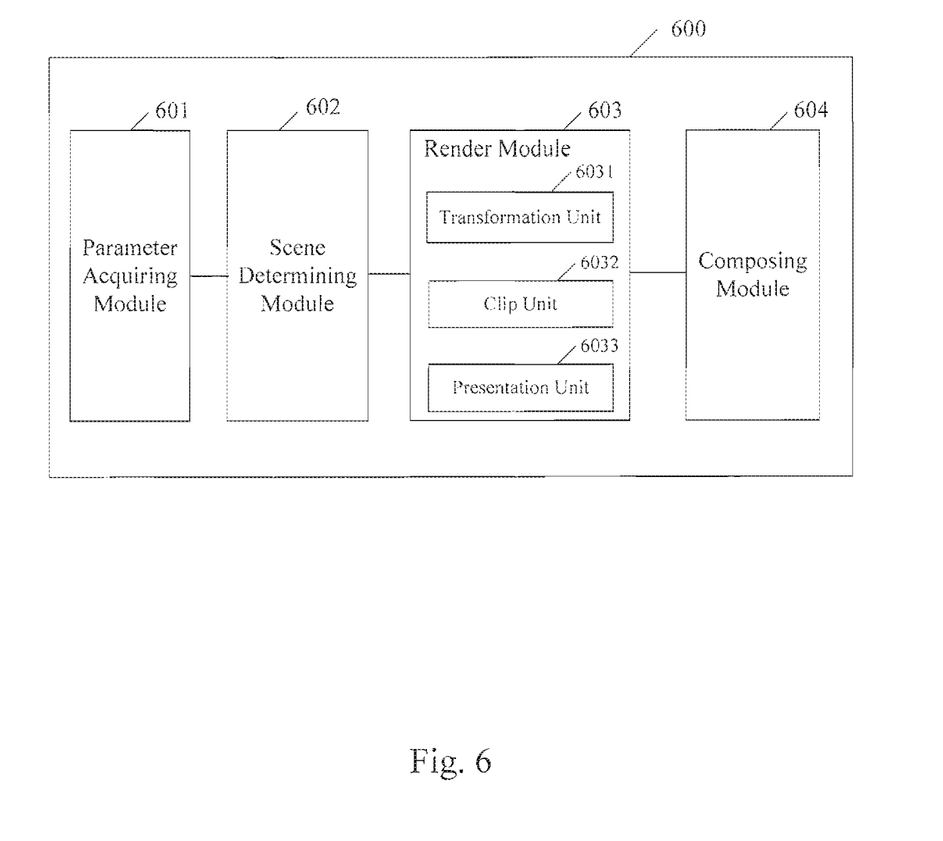
FIG. 6 is a schematic diagram of a clairvoyance device for 3D scene according to an embodiment of the present invention.

Under the same inventive concept, FIG. 6 shows a schematic diagram of a clairvoyance device 600 for 3D scene according to an embodiment of the present invention. This embodiment will be described below in detail in conjunction with the drawings, wherein the same reference numbers are used for the same parts as those in the previous embodiments, and the description thereof is omitted properly.

As shown in FIG. 6, the clairvoyance device 600 of this embodiment comprises: a parameter acquiring module 601 which acquires the parameters associated with the clairvoyance camera and the parameters associated with the clairvoyance viewport; a scene determining module 602 which determines a 3D scene to be rendered according to the parameters associated with the clairvoyance camera acquired by the parameter acquisition module 601; a render module 603 which renders the 3D scene determined by the scene determining module 602 to obtain a 2D image presented in the clairvoyance viewport; and a composing module 604 which composes the 2D image presented in the clairvoyance viewport and the 2D image presented in the general scene viewport.

Regarding the parameters associated with the clairvoyance camera and the parameters associated with the clairvoyance viewport, the detailed description has been provided in the previous embodiments and thus is omitted here. These parameters may be set by the user, and obtained by the parameter acquiring module 601.

Then, in the scene determining module 602, according to the parameters associated with the clairvoyance camera acquired by the parameter acquiring module 601, the 3D scene to be rendered, namely, the 3D scene within the view frustum including the angle of view, the near clipping plane and the far clipping plane in the parameters associated with the clairvoyance camera is determined.

In the render module 603, a transformation unit 6031 transforms the 3D scene determined by the scene determining module 602 to the 2D image. In the embodiment, the transformation unit 6031 uses the clairvoyance transformation. Then, according to the parameters associated with the clairvoyance viewport acquired by the parameter acquiring module 601, a clip unit 6032 clips the transformed 2D image as the 2D image matching the clairvoyance viewport, and the clipped 2D image is presented in the clairvoyance viewport by a presentation unit 6033.

The 2D image in the clairvoyance viewport obtained by the render module 603 is provided to the composing module 604, which composes it and the 2D image in the general scene viewport and outputs the composed 2D image to the frame buffer (not shown) for display on the screen later.

It should be noted that the clairvoyance device 600 of the embodiment is operable to implement the clairvoyance method shown in FIG. 1.

Figure 7:
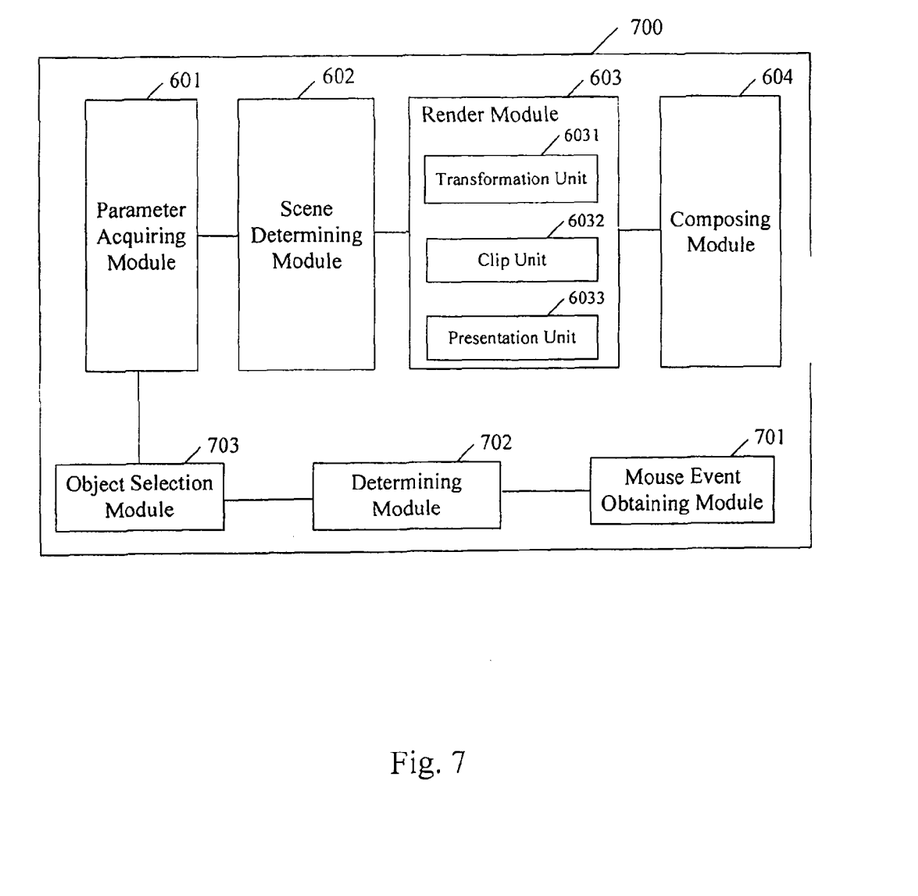
FIG. 7 is a schematic diagram of a clairvoyance device for 3D scene according to another embodiment of the present invention.

FIG. 7 shows a schematic diagram of a clairvoyance device 700 for 3D scene according to another embodiment of the present invention. This embodiment is described below in detail in conjunction with the drawings, wherein the same reference numbers are used for the same parts as those in the previous embodiments, and the description thereof is omitted.

In addition to the above parameter acquiring module 601, the scene determining module 602, the render module 603 and the composing module 604, the clairvoyance device 700 of this embodiment further comprises: a mouse event obtaining module 701 which obtains the manipulation event by the mouse; a determining module 702 which determines whether the mouse is within the clairvoyance viewport; and an object selection module 703 which selects an object pointed to by the mouse according to the parameters associated with the clairvoyance camera acquired by the parameter acquiring module 601 when the mouse is within the clairvoyance viewport, and selects an object pointed to by the mouse according to the related parameters of the general scene camera when the mouse is outside the clairvoyance viewport.

In the embodiment, when the mouse operates on the screen, such as click, move, hover, etc., the mouse event obtaining module 701 obtains the corresponding mouse manipulation event. In response to the mouse event obtaining module 701 obtaining the mouse manipulation event, the determining module 702 determines whether the mouse is within the clairvoyance viewport according to the screen coordinates of the mouse, and the determination result is provided to the object selection module 703. In the object selection module 703, when the mouse is within the clairvoyance viewport, the previously described method of selecting objects is used to select the object pointed by the mouse according to the parameters associated with the clairvoyance camera. When the mouse is not within the clairvoyance viewport, i.e. within the general scene viewport, an object is selected according to the parameters associated with the general scene camera.

It should be noted that the clairvoyance device 700 of this embodiment is operable to implement the clairvoyance method shown in FIG. 4.

The method of the embodiment disclosed above may be implemented in software, hardware, or combination of software and hardware. The hardware portion may be implemented by application specific logic. For example, the clairvoyance device and its components may be implemented by hardware circuit such as large scale integrated circuits or gate arrays, semiconductors such as logic chips, transistors, or programmable hardware devices such as field programmable gate array, programmable logic device and the like, or can be implemented by software which can be executed by various processors, or can be implemented by the combination of the above hardware circuit and software. The software portion may be stored in memory and executed by an appropriate instruction execution system such as microprocessor, personal computer (PC) or mainframe.

Thus, having reviewed the disclosure herein, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying aspects of embodiments of the invention can be, in at least some cases, embodied on a computer readable storage medium. The distinct software modules may include, for example, any one, some, or all of the modules and/or sub-modules in FIGS. 6 and 7.

The means mentioned herein can include (i) hardware module(s), (ii) software module(s), or (iii) a combination of hardware and software modules; any of (i)-(iii) implement the specific techniques set forth herein, and the software modules are stored in a computer readable medium (or multiple such media).

Although the clairvoyance method and device for 3D scene of the present invention have been described in detail through some exemplary embodiments, these embodiments are not exhaustive, and those skilled in the art can realize various changes and modifications within the spirit and scope of the invention. Therefore, the present invention is not limited to these embodiments, the scope of which is only defined by the appended claims.

Though a plurality of exemplary embodiments of the present invention have been illustrated and depicted, the skilled in the art would appreciate that without departing from the principle and spirit of the present invention, changes may be made to these embodiments, and the scope of the present invention is limited by the appending claims and equivalent variations thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A clairvoyance method for 3D scene, comprising:
acquiring parameters associated with a clairvoyance camera and parameters associated with a clairvoyance viewport;
determining a 3D scene to be rendered according to the parameters associated with the clairvoyance camera;
rendering the determined 3D scene to obtain a 2D image presented in the clairvoyance viewport; and
composing the 2D image presented in the clairvoyance viewport and a 2D image presented in a general scene viewport,
wherein the parameters associated with the clairvoyance viewport are configured to obtain the 2D image rendered from the 3D scene and include: position, shape and size of the clairvoyance viewport, wherein the 2D image presented in the clairvoyance viewport is different than the 2D image presented in a general scene viewport.

2. The clairvoyance method according to claim 1, wherein the parameters associated with the clairvoyance camera are configured to determine the 3D scene and include: position and direction of the clairvoyance camera, and angle of view, near clipping plane and far clipping plane of a view frustum, wherein the 3D scene determined according to the parameters associated with the clairvoyance camera is different than a 3D scene determined in order to obtain the 2D image presented in the general scene viewpoint.

3. The clairvoyance method according to claim 1, wherein the step of rendering the determined 3D scene to obtain the 2D image presented in the clairvoyance viewport comprises:
   transforming the determined 3D scene to determine a transformed 2D image according to the parameters associated with the clairvoyance camera; and
   clipping the transformed 2D image to determine the 2D image according to the parameters associated with the clairvoyance viewport.

4. The clairvoyance method according to claim 1, further comprising:
   obtaining a manipulation event by a mouse;
   determining whether the mouse is within the clairvoyance viewport; and
   selecting an object pointed to by the mouse according to the parameters associated with the clairvoyance camera upon determining that the mouse is within the clairvoyance viewport.

5. The clairvoyance method according to claim 4, further comprising:
   selecting an object pointed to by the mouse according to parameters associated with a general scene camera upon determining that the mouse is outside the clairvoyance viewport.

6. The method of claim 1, further comprising providing a system, wherein the system comprises distinct software modules, each of the distinct software modules being embodied on a computer-readable storage medium, and wherein the distinct software modules comprise a parameter acquiring module, a scene determining module, a rendering module, and a composing module;
   wherein:
      said acquiring of said parameters associated with said clairvoyance camera and said parameters associated with said clairvoyance viewport is carried out by said parameter acquiring module executing on at least one hardware processor;
      said determining of said 3D scene to be rendered according to the parameters associated with the clairvoyance camera is carried out by said scene determining module executing on said at least one hardware processor;
      said rendering of the determined 3D scene to obtain the 2D image presented in the clairvoyance viewport is carried out by said rendering module executing on said at least one hardware processor; and
      said composing of the 2D image presented in the clairvoyance viewport and the 2D image presented in the general scene viewport is carried out by said composing module executing on said at least one hardware processor.

7. A clairvoyance device for 3D scene, comprising:
   a parameter acquiring module that acquires parameters associated with a clairvoyance camera and parameters associated with a clairvoyance viewport;
   a scene determining module that determines a 3D scene to be rendered according to the parameters associated with the clairvoyance camera;
   a rendering module that renders the determined 3D scene to obtain a 2D image presented in the clairvoyance viewport; and
   a composing module that composes the 2D image presented in the clairvoyance viewport and a 2D image presented in a general scene viewport,
   wherein the parameters associated with the clairvoyance viewport are configured to obtain the 2D image rendered from the 3D scene and include: position, shape and size of the clairvoyance viewport, wherein the 2D image presented in the clairvoyance viewport is different than the 2D image presented in a general scene viewport.

8. The clairvoyance device according to claim 7, wherein the parameters associated with the clairvoyance camera are configured to determine the 3D scene and include: position and direction of the clairvoyance camera, and angle of view, near clipping plane and far clipping plane of a view frustum, wherein the 3D scene determined according to the parameters associated with the clairvoyance camera is different than a 3D scene determined in order to obtain the 2D image presented in the general scene viewpoint.

9. The clairvoyance device according to claim 7, wherein the render module comprises:
   a transformation unit that transforms the determined 3D scene to determine a transformed 2D image according to the parameters associated with the clairvoyance camera;
   a clip unit that clips the transformed 2D image to determine the 2D image according to the parameters associated with the clairvoyance viewport; and
   a presentation unit that presents the clipped 2D image in the clairvoyance viewport.

10. The clairvoyance device according to claim 7, further comprising:
   a mouse event obtaining module that obtains a manipulation event by a mouse;
   a determining module that determines whether the mouse is within the clairvoyance viewport; and
   an object selection module that selects an object pointed to by the mouse according to the parameters associated with the clairvoyance camera, if the determining module determines that the mouse is within the clairvoyance viewport.

11. The clairvoyance device according to claim 10, wherein the object selection module is further configured to select an object pointed to by the mouse according to the related parameters of a general scene camera, if the determining module determines that the mouse is outside the clairvoyance viewport.

12. The clairvoyance device according to claim 7, wherein:
   said parameter acquiring module comprises at least one of a dedicated parameter acquiring hardware module and a parameter acquiring module, tangibly embodied on at least one computer-readable storage medium, executing on at least one hardware processor;
   said scene determining module comprises at least one of a dedicated scene determining hardware module and a scene determining module, tangibly embodied on said at least one computer-readable storage medium, executing on said at least one hardware processor;
   said rendering module comprises at least one of a dedicated rendering module and a rendering module, tangibly embodied on said at least one computer-readable storage medium, executing on said at least one hardware processor; and
   said composing module comprises at least one of a dedicated composing hardware module and a composing module, tangibly embodied on said at least one computer-readable storage medium, executing on said at least one hardware processor.

13. A method, comprising:
   acquiring parameters associated with a clairvoyance camera and parameters associated with a clairvoyance viewport;

transforming three-dimensional scene data to two-dimensional image data according to the parameters associated with the clairvoyance camera;

rendering the two-dimensional image data according to the parameters associated with the clairvoyance viewport; and displaying a composed two-dimensional image comprising the two-dimensional image data rendered according to the parameters associated with the clairvoyance viewport and two-dimensional image data transformed from the three-dimensional scene data according to parameters associated with a general scene camera and rendered according to parameters associated with a general scene viewport, wherein the two-dimensional image data rendered according to the parameters associated with the clairvoyance viewport is different than the two-dimensional image data transformed from the three-dimensional scene data according to the parameters associated with a general scene camera.

14. The method according to claim 13, wherein the parameters associated with the clairvoyance camera include: position and direction of the clairvoyance camera, and angle of view, near clipping plane and far clipping plane of a view frustum.

15. The method according to claim 13, wherein the parameters associated with the clairvoyance viewport include: position, shape and size of the clairvoyance viewport.

16. The method according to claim 13, wherein the step of rendering the two-dimensional image data according to the parameters associated with the clairvoyance viewport comprises clipping the two-dimensional image data and presenting clipped two-dimensional image data according to the parameters associated with the clairvoyance viewport.

17. The method according to claim 13, further comprising:
obtaining a manipulation event by a mouse;
determining that the mouse is within the clairvoyance viewport; and
selecting an object pointed to by the mouse according to the parameters associated with the clairvoyance camera, upon determining that the mouse is within the clairvoyance viewport, wherein the two-dimensional image data rendered according to the parameters associated with the clairvoyance viewport is superimposed on the two-dimensional image data rendered according to parameters associated with a general scene viewport.

18. The method according to claim 13, further comprising:
obtaining a manipulation event by a mouse;
determining that the mouse is outside the clairvoyance viewport; and
selecting an object pointed to by the mouse according to the parameters associated with the general scene camera, upon determining that the mouse is outside the clairvoyance viewport.

* * * * *